United States Patent
Trakas

(10) Patent No.: US 7,850,895 B2
(45) Date of Patent: Dec. 14, 2010

(54) SPRUE BAR SHUTOFF METHOD

(76) Inventor: Panos Trakas, 1769 Whispering Ct., Addison, IL (US) 60101

( * ) Notice: Subject to any disclaimer, the term of this patent is extended or adjusted under 35 U.S.C. 154(b) by 0 days.

(21) Appl. No.: 12/702,398

(22) Filed: Feb. 9, 2010

(65) Prior Publication Data

US 2010/0155996 A1 Jun. 24, 2010

Related U.S. Application Data

(62) Division of application No. 12/343,064, filed on Dec. 23, 2008, now Pat. No. 7,775,789.

(51) Int. Cl.
*B29C 45/20* (2006.01)
*B29C 45/38* (2006.01)

(52) U.S. Cl. .................. 264/328.9; 264/328.11

(58) Field of Classification Search .............. 264/328.1, 264/328.9, 328.11; 425/562–569
See application file for complete search history.

(56) References Cited

U.S. PATENT DOCUMENTS

| | | | |
|---|---|---|---|
| 5,458,843 A | 10/1995 | Brown et al. | |
| 5,494,254 A | 2/1996 | Dominka | |
| 5,968,562 A | 10/1999 | Schad et al. | |
| 6,793,480 B2 | 9/2004 | Dominka | |
| 7,357,172 B2 | 4/2008 | Teng et al. | |
| 7,393,198 B2 | 7/2008 | Niewels et al. | |
| 7,393,479 B2 | 7/2008 | Mai | |
| 7,396,227 B2 * | 7/2008 | Nakaya et al. | 425/562 |
| 7,416,402 B2 * | 8/2008 | Babin | 425/542 |
| 7,427,197 B2 | 9/2008 | Ciccone et al. | |
| 7,678,320 B2 * | 3/2010 | Klobucar | 264/328.1 |

OTHER PUBLICATIONS

Plastic Process Equipment, Inc., 6 Stock Screw Tip Styles, downloaded from www.ppe.com/09cat/0852-0853.pdf on Jan. 30, 2009.

* cited by examiner

*Primary Examiner*—Jill L Heitbrink
(74) *Attorney, Agent, or Firm*—Momkus McCluskey, LLC; Jefferson Perkins; Steven P. Behnken

(57) ABSTRACT

A method for connecting and disconnecting an injection molding machine to and from a shutoff assembly includes the steps of mating a nozzle of the injection molding machine to a seat in an exterior wall of a chamber of the shutoff assembly, advancing an elongate stem through a first opening into the chamber, and flowing molten polymer into the chamber and out a second opening in the chamber and on to a mold or sprue bar. The mold may be decompressed by maintaining a movable body disposed in the chamber in a forward position with the elongate stem and allowing the molten polymer to flow out the first opening. The injection molding machine may be disconnected from the shutoff assembly by withdrawing the stem of the nozzle from the chamber through the first opening, allowing molten polymer downstream of the movable body to push the movable body into engagement with a sealing surface of a interior entry wall of the chamber, and disconnecting the nozzle from the seat.

7 Claims, 6 Drawing Sheets

SPRUE BAR SHUTOFF METHOD

RELATED APPLICATIONS

This application is a division of U.S. patent application Ser. No. 12/343,064, filed Dec. 23, 2008, the specification and drawings of which are fully incorporated by reference herein.

BACKGROUND OF THE INVENTION

The present invention relates to injection molding machines, and in particular, a sprue bar shutoff method used in a system that transports molten polymer from the molding machine to at least one stack mold by way of a sprue bar.

It is known to provide stack molds in injection molding machines in which there are at least two sets of molding chambers which divide along separate parting lines. One method of delivering molten polymer to all of the molding chambers in a stack mold is by a sprue bar. A sprue bar extends from a sprue of the molding machine, along the axis of the stack mold assembly, to a central manifold located between at least two mold plates in the stack. A plurality of nozzles in turn provide conduits for the molten polymer from the manifold to each of the molding cavities, with some of the nozzles extending forward in an axial direction to those mold cavities which are forward of the manifold, and the rest of the nozzles extending rearward in an opposite axial direction to those mold cavities which are rearward of the manifold. A representative sprue bar-equipped stack mold is illustrated in FIG. 2 of U.S. Pat. No. 7,427,197 to Ciccone et al.

After the molten polymer has been injected under pressure into the molding chambers, the system is depressurized, the cavities are cooled, the plates forming the molding chambers are separated, and the molded piece or pieces are ejected. During this process it is necessary to disconnect the sprue from the sprue bar. Upon disconnection, molten polymer or "drool" will often be produced from the orifice of the sprue bar, resulting in the loss of raw material and additional cleanup costs. If enough molten polymer drools from the sprue bar, it may solidify and prevent complete closure of the mold, causing damage to the equipment, expensive repairs, and lost production. At the very least, this drooling effect requires removal by a technician, increasing the time between cycles. Thus, it would be desirable to provide a sprue bar shutoff device that reduces the amount of drool or prevents it completely.

SUMMARY OF THE INVENTION

The present invention provides, among other things, an improved sprue bar shutoff device that reduces or eliminates drool. According to one aspect of the invention, the shutoff device includes an exterior seat that is sealable to a nozzle of an injection molding machine that is spaced from the assembly when not engaged. The assembly also includes a first opening that provides fluid communication from the exterior seat to a chamber having an entry wall and a first sealing surface surrounding the first opening. The assembly also includes a movable body that is reciprocally movable within the chamber from a rear position proximate to the entry wall to a forward position remote from the entry wall. The movable body has a second sealing surface that seals with the first sealing surface in the entry wall when in the rear position.

The chamber includes an exit wall with a second opening providing fluid communication with at least one receiving unit such as a sprue bar. An elongated stem of the injection molding machine nozzle may be inserted through the first opening at or after the time of connecting the injection molding machine to the shutoff assembly. The forward end of the elongate stem contacts the movable body, preventing the movable body from moving to the rear position.

One or more passages of the chamber extend from the entry wall to the exit wall and transport molten polymer from the first opening to the second opening when the movable body is in the forward position. The movable body moves to the rear position when the stem is withdrawn from the first opening, which allows the first and second sealing surfaces to contact each other, thereby closing the first opening and reducing or preventing drool. Preferably, the movable body is pushed to the rear position by the molten polymer downstream of the movable body.

According to another aspect of the invention, an injection mold shutoff assembly includes an exterior seat that is sealable to a nozzle of an injection molding machine which is spaced from the assembly when not engaged. The assembly also includes a first opening that provides fluid communication from the exterior seat to a chamber having an entry wall and a first sealing surface surrounding the first opening. As above, a movable body is reciprocally movable within the chamber from a rear position proximate to the entry wall to a forward position remote from the entry wall. The movable body has a second sealing surface that seals with the first sealing surface in the entry wall when in the rear position.

Additionally, the chamber has an exit wall with a second opening providing fluid communication with at least one mold. One or more passages of the chamber extend from the entry wall to the exit wall and transport molten polymer from the first opening to the second opening when the movable body is in the forward position. The movable body moves to the rear position when the molding machine nozzle is in a nonengaged position, since it is being pushed by molten polymer downstream of the movable body which allows the first and second sealing surfaces to contact each other, thereby closing the first opening.

In another aspect of the invention, a method for connecting and disconnecting an injection molding machine to and from a shutoff assembly includes the steps of mating a nozzle of the injection molding machine to a seat in an exterior wall of a chamber of the shutoff assembly. The seat is in fluid communication with the chamber through a first opening extending from the exterior wall to an interior entry wall of the chamber. The interior entry wall has a first sealing surface around the first opening.

An elongate stem of the nozzle is advanced through the first opening into the chamber. Molten polymer then flows through the first opening, to a second opening in an interior exit wall of the chamber, and then to at least one receiving device such as a sprue bar.

The injection molding system is then decompressed by stopping the flow of the molten polymer through the first opening. The stem prevents the movable body from reaching a rear position where a second sealing surface of the movable body seals to the first sealing surface. Instead, the movable body is maintained in a forward position where the first and second sealing surfaces are spaced from each other and molten polymer is allowed to flow from the second opening, around the movable body, and through the first opening into the injection molding nozzle 200.

The injection molding machine is disconnected from the assembly by withdrawing the stem of the nozzle from the chamber through the first opening. If there is any pressure left in the system, molten polymer downstream of the movable body will push the second sealing surface of the movable body into sealing engagement with the first sealing surface of the interior entry wall. The nozzle is then disconnected from the seat in the exterior wall of the chamber.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
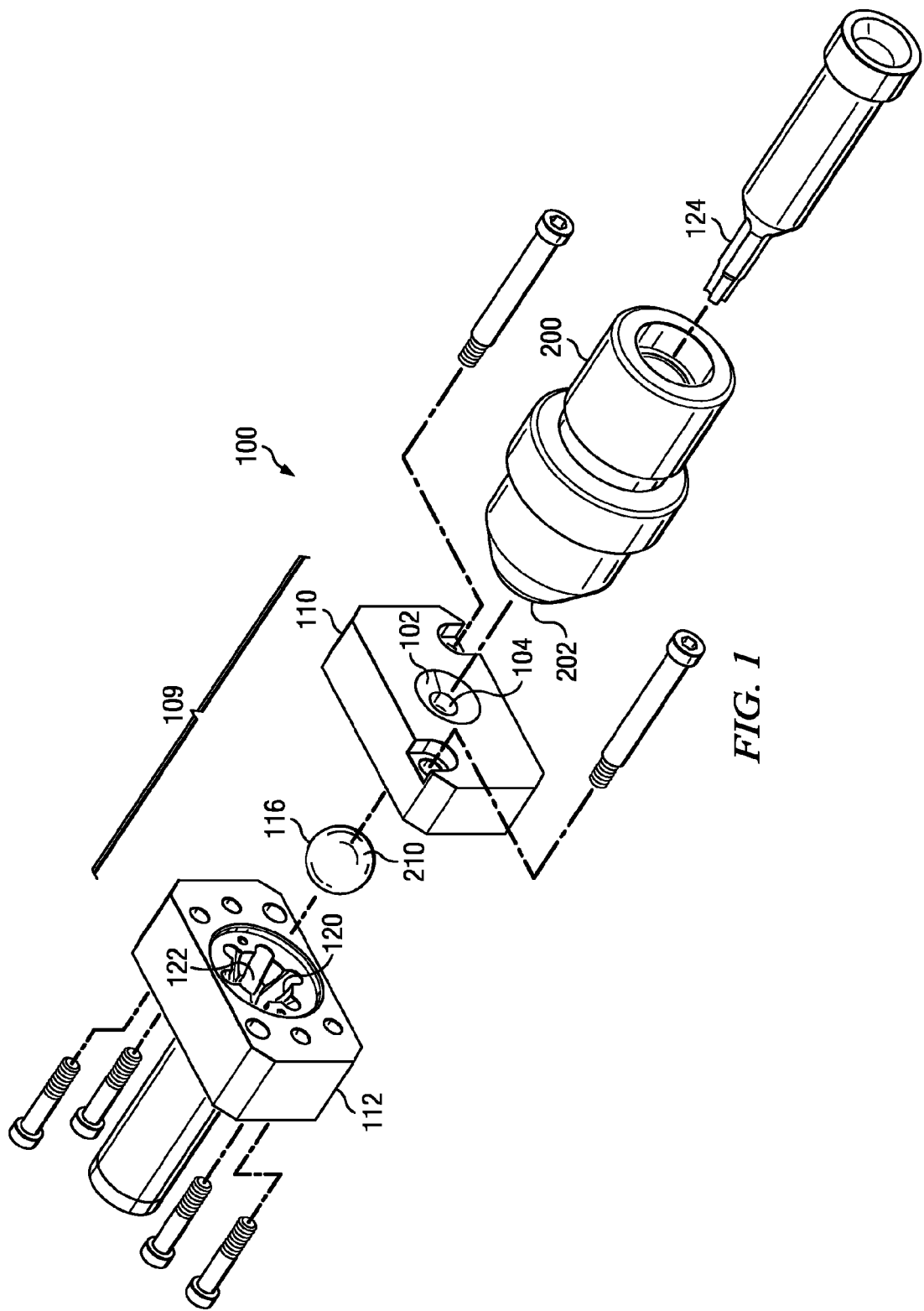
FIG. 1 is an exploded isometric view of a sprue bar shutoff device according to the invention.
Figure 2:
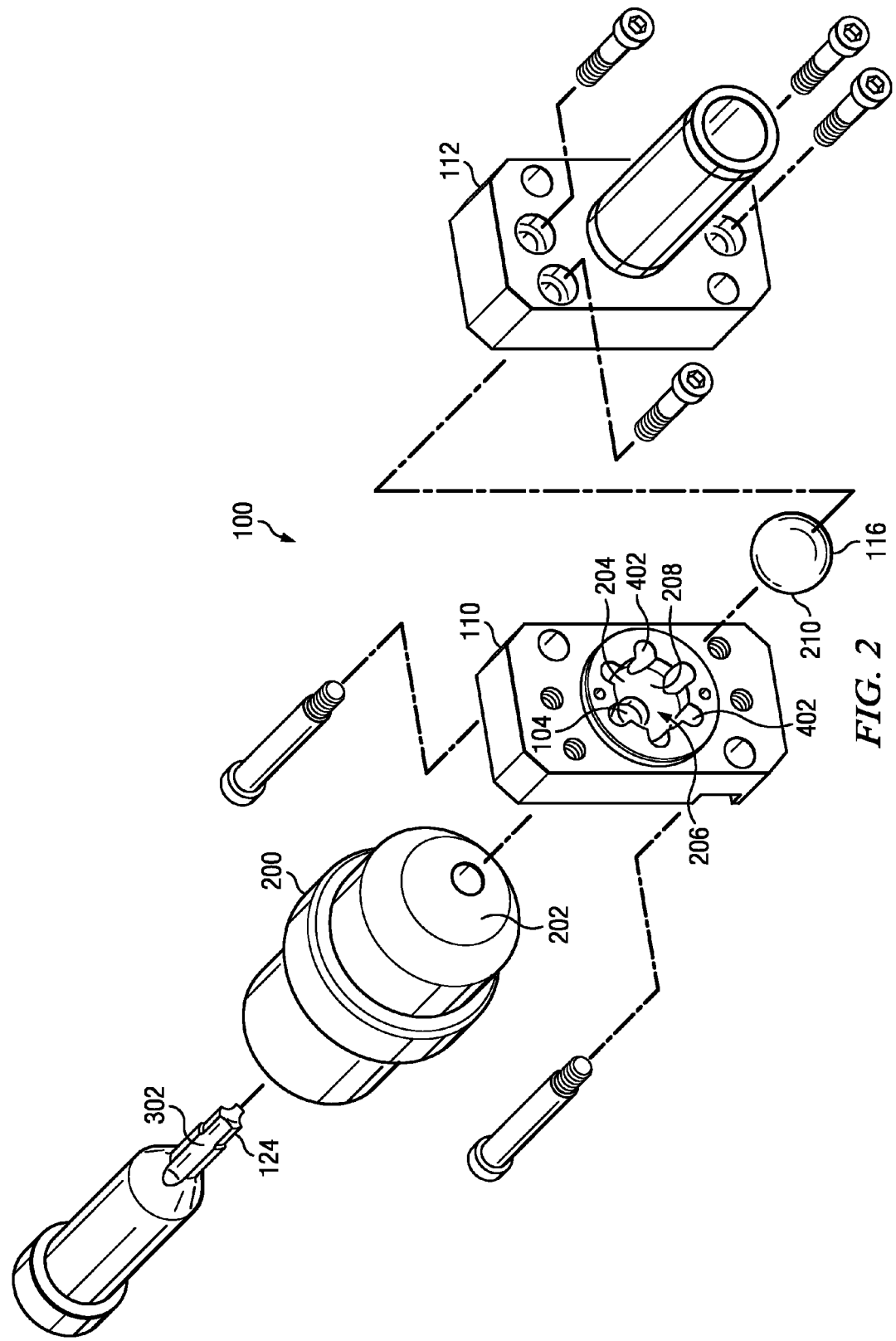
FIG. 2 is an exploded rear isometric view of the assembly shown in FIG. 1.

Referring to FIGS. 1 and 2, in a first embodiment of the invention, an injection mold shutoff apparatus, indicated generally at 100, includes an exterior seat 102 sealable to a front mating surface 202 of an injection molding machine nozzle 200 that is spaced from the assembly when not engaged. A first opening 104 in an entry wall 204 of a chamber 206 provides fluid communication from the exterior seat 102 in the assembly piece 110 to the chamber 206 in assembly block 109, which is preferably formed by mating two assembly block halves 110 and 112. The entry wall 204 has a first sealing surface 208 surrounding the first opening and the chamber 104 includes a movable body 116 that can move within the chamber between a rear position proximate to the entry wall and a forward position remote from the entry wall. See FIGS. 4 and 5, respectively. Preferably, the flow of the molten polymer is sufficient to change the position of the movable body 116.

Additionally, the movable body 116 has a second sealing surface 210 that seals with the first sealing surface 208 of the entry wall 204 when in the rear position. The movable body 116 may be selected to be of any shape capable of sealing with the first sealing surface of the entry wall including, but not limited to, an ellipsoid, a sphere, or a wedge. The shapes of the first and second sealing surfaces should be complimentary.

The chamber also has an exit wall 120 with a second opening 122 that provides fluid communication with a receiving unit such as a sprue bar.

Figure 5:
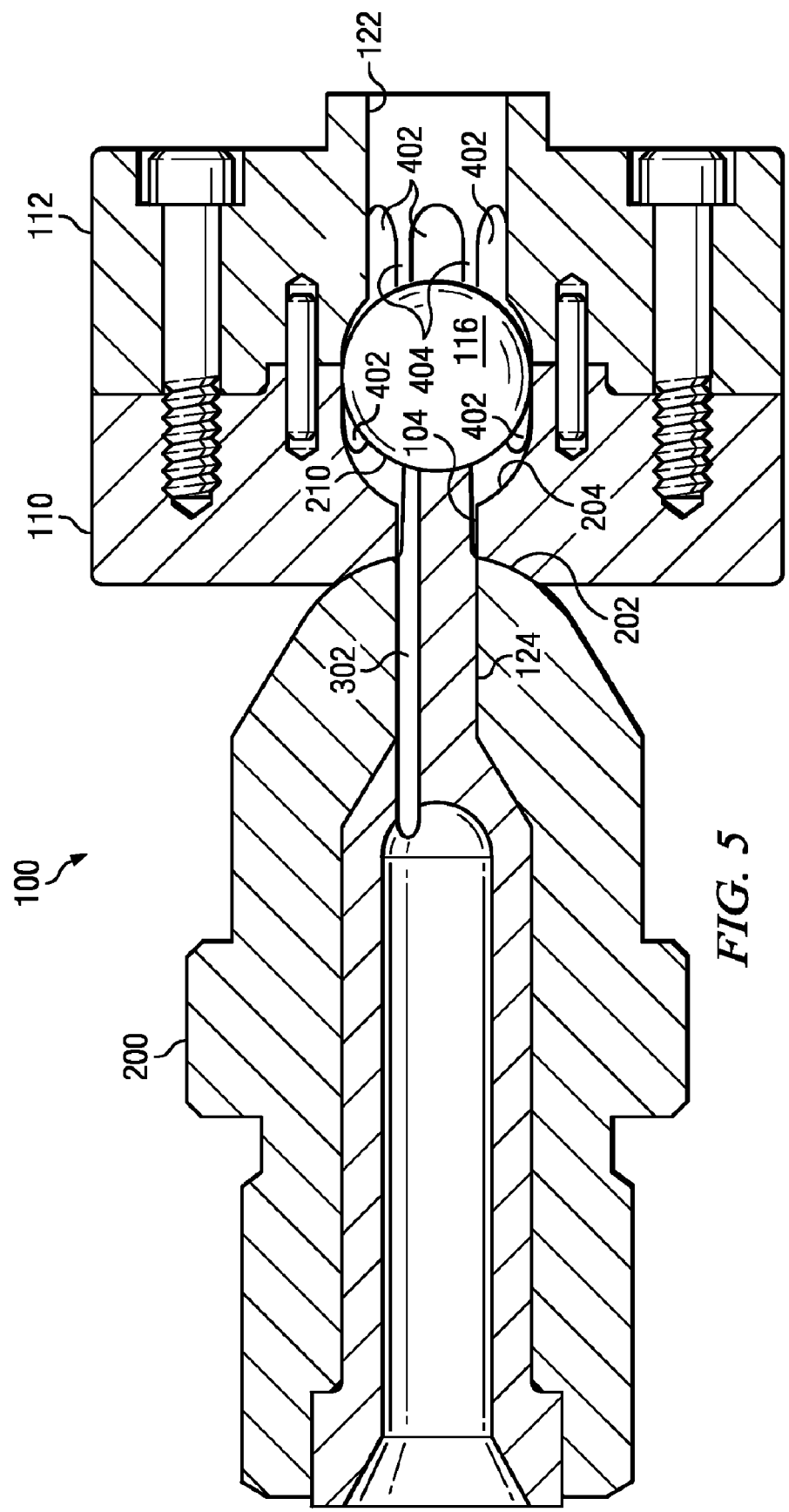
FIG. 5 is an axial sectional view of the sprue bar assembly shown in FIG. 1, with a movable body or ball in a forward position.

An elongated stem 124 may be fixed relative to the rest of nozzle 200 or, in an alternative embodiment (not shown), may be refracted into and extended from the rest of the nozzle 200 during a process of disconnecting from, or connecting to, the assembly block 109. As shown in FIG. 5, the elongated stem 124 is advanced through the first opening 104 at the time of connecting the injection mold machine nozzle 200 to the shutoff assembly bock 109. Alternatively, an articulated elongated stem (not shown) may be advanced from a refracted position in nozzle 200 through the first opening 104 after the nozzle front surface 202 is sealed to the exterior seat 102. While it is not required that the stem push the movable body 116 from the rear position to the forward position, it is contemplated that the stem can do so.

Figure 3:
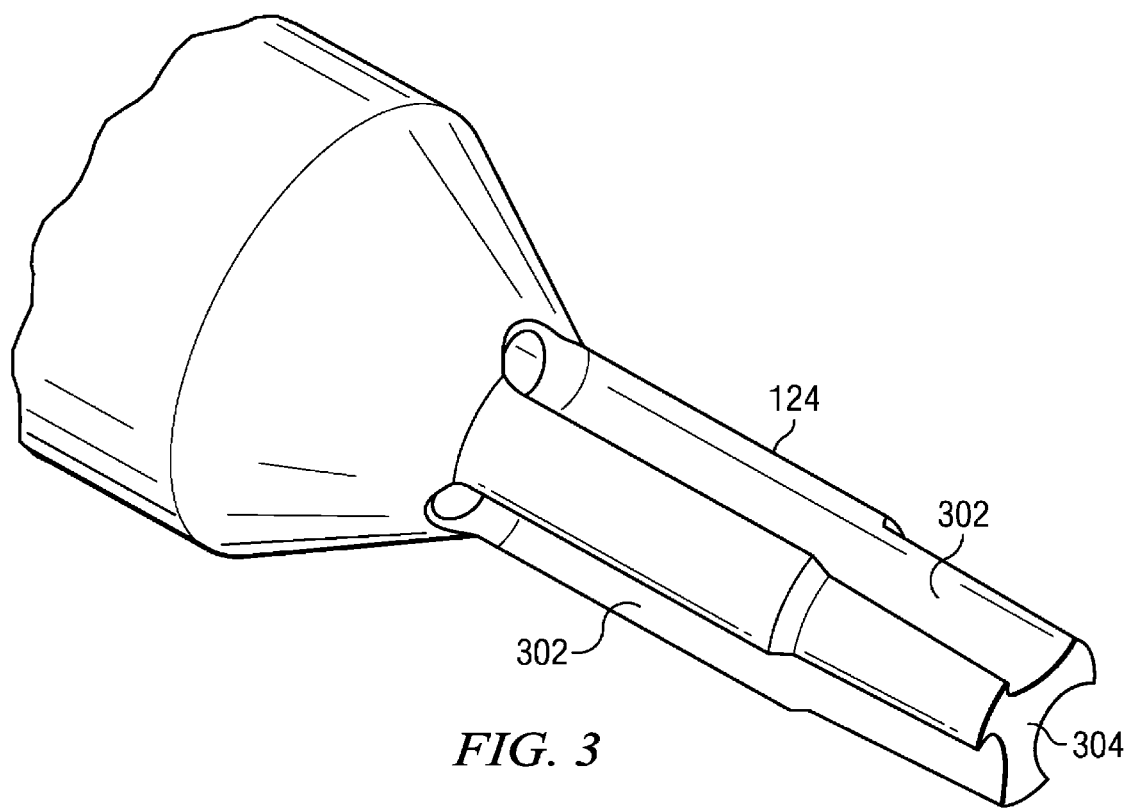
FIG. 3 is a partial isometric view of a nozzle stem according to the invention.

Referring to FIG. 3, the elongated stem 124 preferably includes at least one channel 302 that permits flow of the polymer through the nozzle 200 and into the chamber 206 and even more preferably has a plurality of such channels (such as three) distributed around and parallel to the nozzle axis. Alternatively, the molten polymer may flow around the stem into the chamber. The stem also includes a preferably concave forward end 304 that contacts the movable body 116 when inserted through the first opening to prevent it from moving back to the rear position when under pressure by the molten polymer.

Figure 4:
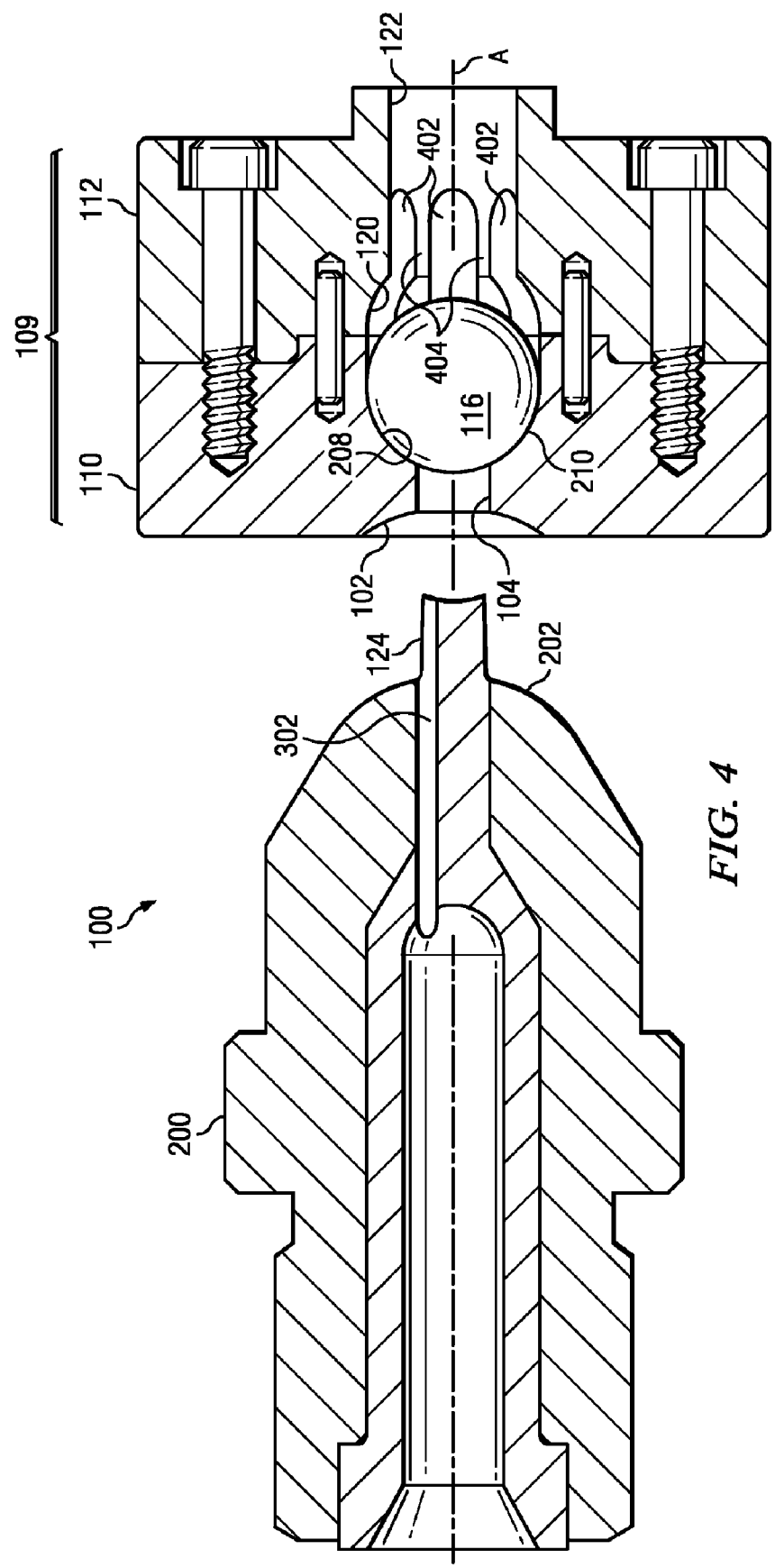
FIG. 4 is an axial sectional view of the sprue bar assembly shown in FIG. 1, with a movable body or ball in a rear position.

Referring to FIGS. 4 and 5, one or more passages 402 of the chamber formed into the halves 110 and 112 extend from the entry wall 204 to the exit wall 120. This provides fluid communication between the first opening 104 and the second opening 122, thereby transporting molten polymer when the movable body 116 is in the forward position. The passages 402 are sealed by the movable body 116 when the movable body 116 is in the rear position.

The chamber may further include a plurality of ridges 404 in the chamber that extend from the entry wall 204 to the exit wall 120 so as to constrain the movement of the movable body along a path of motion, preferably a straight, axial path. More preferably, the passages 402 and ridges 404 are placed circumferentially around an axis defined by the path of motion and the passages are spaced from each other by the ridges.

When the stem 124 is withdrawn from the first opening 104, the movable body 116 moves to the rear position, allowing the first and second sealing surfaces 208, 210 to contact each other, thereby closing the first opening 104. In a preferred embodiment, the movable body 116 is pushed to the rear position by the molten polymer downstream of the movable body 116 and no spring, incline, or decline is used to bias the movable body 116 to either the forward of rear position.

Figure 6:
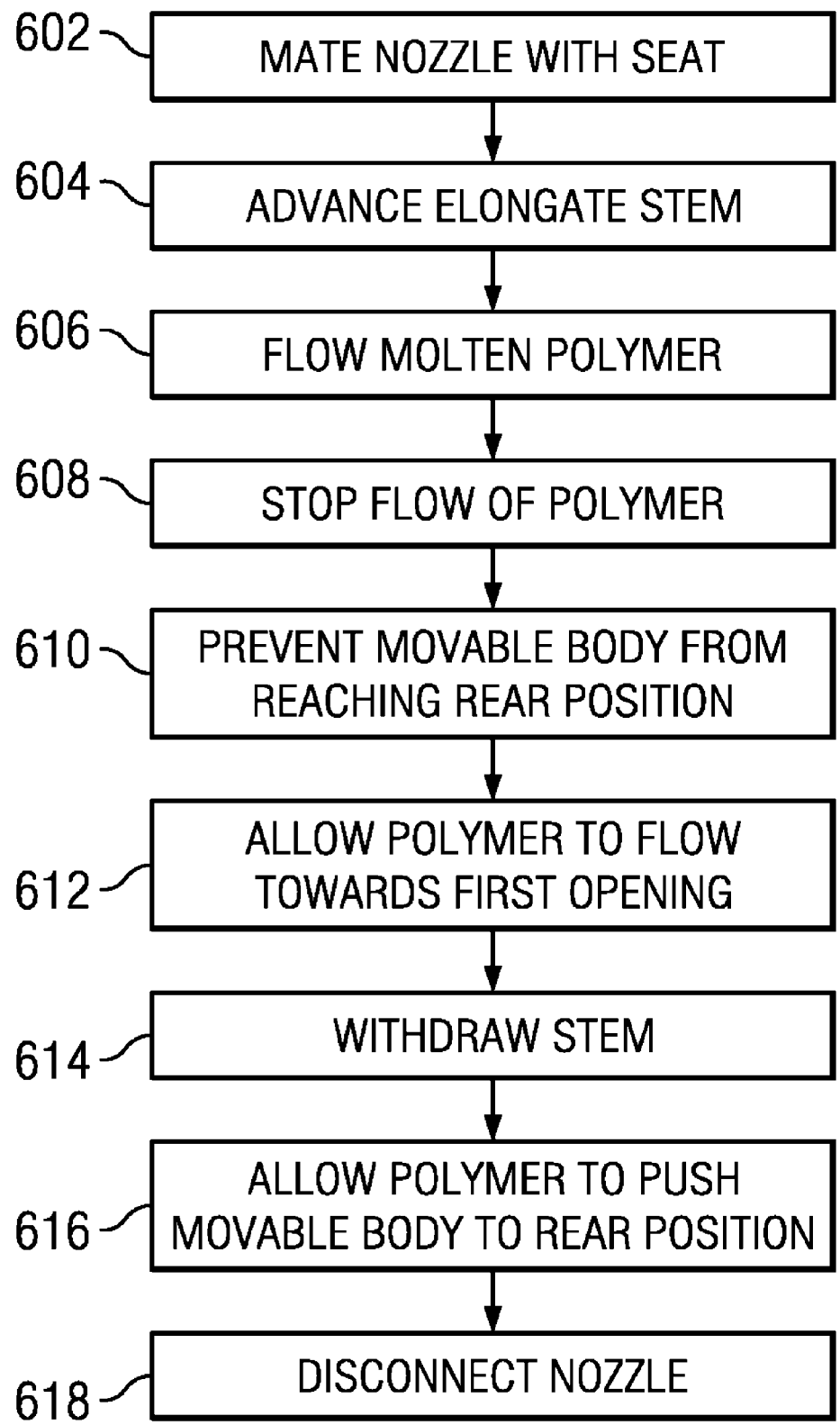
FIG. 6 is a flow diagram showing a method for connecting and disconnecting an injection molding machine to and from a shutoff assembly.

Referring to FIG. 6, in another aspect of the invention, a method for connecting and disconnecting an injection molding machine to and from a shutoff assembly includes the steps of mating (602) a nozzle of the injection molding machine to a seat in an exterior wall of a chamber of a shutoff assembly. The seat is in fluid communication with the chamber through a first opening extending from the exterior wall to an interior entry wall of the chamber. The interior entry wall has a first sealing surface around the first opening.

An elongate stem of the nozzle is advanced (604) through the first opening into the chamber. The stem may be fixed to the nozzle or may be retracted to and from an advanced position as desired by the user. Thus, the stem may be advanced into the first opening after or concurrently with the step of mating the nozzle to the seat. Similarly, the stem may be removed from the first opening before or concurrently with the step of disconnecting the nozzle from the seat.

Molten polymer then flows (606) through the first opening through channels 402 to the second opening in an interior exit wall of the chamber and then to one or more sprue bars or molds in fluid communication with the second opening. The molten polymer may flow around a small-diameter stem into the chamber or, alternatively, through one or more channels in the stem such as channels 302. Preferably, the molten polymer then flows around the movable body through one or more channels 402 that provide fluid communication between the first and second openings when the movable body is in the forward position.

At the conclusion of injecting polymer into a mold cavity, the injection molding system is then decompressed by stopping (608) the flow of the molten polymer through the first opening. The movable body is prevented (610) by the stem 124 from reaching a rear position where a second sealing surface of the movable body 116 seals to the first sealing surface of the chamber wall. Instead, the movable body is maintained in a forward position where the first and second sealing surfaces are spaced from each other and molten polymer is allowed (612) to flow in the direction from the second opening, around the movable body, and toward the first opening.

The injection molding machine is disconnected from the assembly by withdrawing (614) the stem of the nozzle from the chamber through the first opening. Molten polymer downstream of the movable body is allowed (616) to push the second sealing surface of the movable body 116 into sealing engagement with the first sealing surface formed in the interior entry wall. Preferably, no spring, incline, or decline is used to bias the movable body in either the forward or rear positions. The nozzle is then disconnected (618) from the seat in the exterior wall of the chamber. As discussed previously, the stem may be removed from the first opening before or concurrently with the step of disconnecting the nozzle from the seat.

In summary, the method and assemblies described herein decrease material loss due to drooling, increase reliability, and lower maintenance costs. They may be used anywhere a shutoff for molten polymer is required including, but not limited to sprue bars, hot runners, cold runners, and plates.

While illustrated embodiments of the present invention have been described and illustrated in the appended drawings, the present invention is not limited thereto but only by the scope and spirit of the appended claims.

I claim:

1. A method for connecting and disconnecting an injection molding machine to and from a shutoff assembly, comprising the steps of:
   connecting the injection molding machine to the mold, the step of connecting including the substeps of:
      mating a nozzle of the injection molding machine to a seat in an exterior wall of a chamber of a shutoff assembly, the seat in fluid communication with the chamber through a first opening extending from the exterior wall to an interior entry wall of the chamber, the interior entry wall having a first sealing surface around the first opening;
      advancing an elongate stem of the nozzle through the first opening into the chamber;
      flowing molten polymer through the first opening, to a second opening in an interior exit wall of the chamber and thence to at least one mold or sprue bar in fluid communication with the second opening;
   decompressing the mold, said step of decompressing comprising the substeps of:
      preventing a movable body disposed in the chamber from reaching a rear position, in which a second sealing surface of the movable body seals to the first sealing surface, by maintaining the movable body in a forward position with the elongate stem, in which the second sealing surface of the movable body is spaced from the first sealing surface; and
      allowing molten polymer to flow in the direction from the second opening to the first opening;
   disconnecting the injection molding machine from the assembly, said step of disconnecting including the substeps of:
      withdrawing the stem of the nozzle from the chamber through the first opening;
      allowing molten polymer downstream of the movable body to push the second sealing surface of the movable body into sealing engagement with the first sealing surface of the interior entry wall; and
      disconnecting the nozzle from the seat in the exterior wall of the chamber of the shutoff assembly.

2. The method of claim 1, wherein after connecting the nozzle to the exterior seat, the molten polymer flows through at least one channel in the stem into the chamber of the shutoff assembly.

3. The method of claim 1, wherein the molten polymer flows around the elongate stem.

4. The method of claim 1, wherein the molten polymer flows around the movable body into at least one channel communicating the first opening to the second opening when the movable body is in the forward position.

5. The method of claim 1, wherein the step of allowing molten polymer to push the second sealing surface of the movable body into sealing engagement with the first sealing surface in the interior entry wall does not further comprise a spring, incline, or decline to bias the movable body to either the rear position or forward position.

6. The method of claim 1, further comprising the steps of:
   after said substep of mating, advancing the movable stem of the nozzle through the first opening into the chamber; and
   during said step of disconnecting, withdrawing the movable stem through the first opening and back into the nozzle prior to disconnecting the nozzle from the seat in the exterior wall.

7. The method of claim 1, wherein the substep of advancing the stem of the nozzle is performed simultaneously with the step of mating the nozzle to the seat in the exterior wall.

* * * * *